Dec. 29, 1942.    F. NIESEMANN    2,306,746
GAS PRESSURE REGULATOR
Filed May 10, 1941

Inventor
Fritz Niesemann
By Lewis D. Konigsford
Attorney

Patented Dec. 29, 1942

2,306,746

UNITED STATES PATENT OFFICE 2,306,746

GAS PRESSURE REGULATOR

Fritz Niesemann, Pittsburgh, Pa., assignor to Pittsburgh Equitable Meter Company, Pittsburgh, Pa., a corporation of Pennsylvania Application May 10, 1941, Serial No. 392,899

2 Claims. (Cl. 50—26)

The present invention relates to gas pressure regulators and relates in particular to safety release means for such regulators which will allow release of pressure above a predetermined safe maximum, and which will not interfere with the normal operation of the regulator.

This invention has for its object the provision of a safety release in a gas pressure regulator which will release the pressure above a predetermined differential over the setting of the regulator regardless of the loading on the regulator diaphragm.

A further object is the provision on a gas pressure regulator of a vent construction which will dampen movements of the regulator diaphragm to prevent pulsation and will also allow free escape of gas in event the safety release is brought into operation.

A further object is the provision of such a regulator which is inexpensive to manufacture and is rugged and reliable.

These and other objects will be apparent from a consideration of the following specification taken in connection with the annexed drawing, wherein I have shown a preferred embodiment of my invention by way of example, and wherein.

Figure 1:
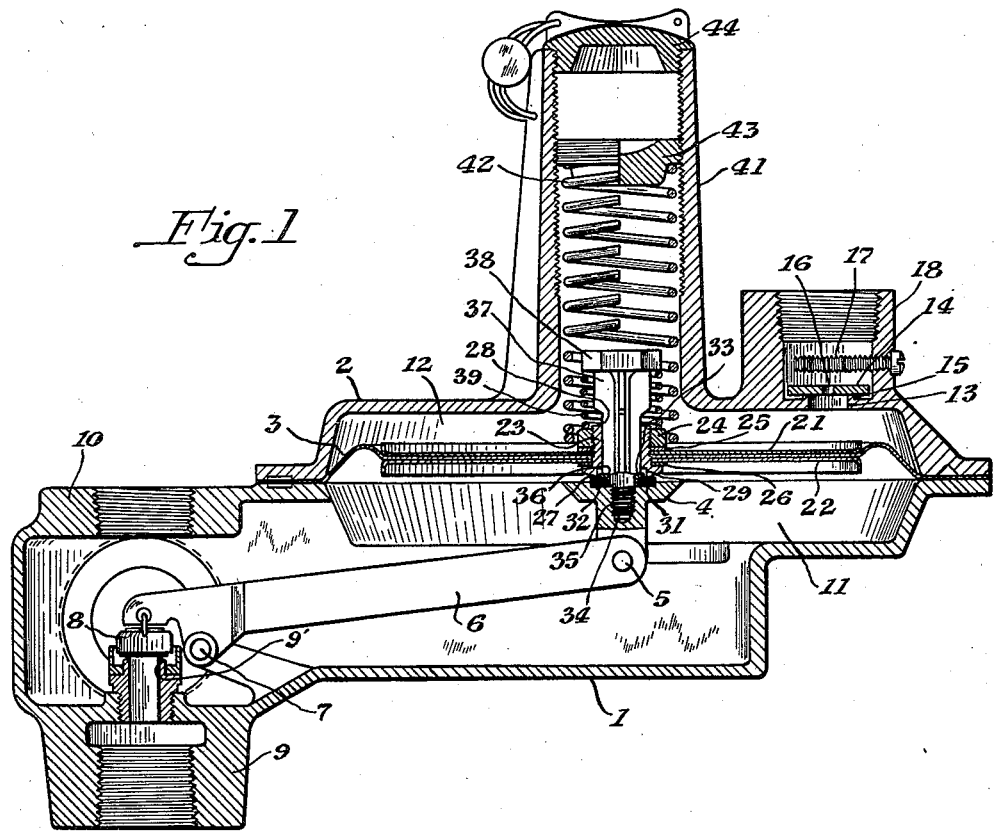
Figure 1 is a view in vertical section of a preferred embodiment.
Figure 2:
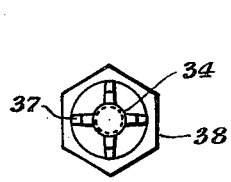
Figure 2 is a bottom view of a detail.
Figure 3:
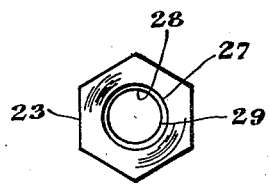
Figure 3 is a bottom view of the hollow release member.

Referring to Figure 1 of the drawing, the pressure regulator in its general construction is of well-known form and comprises a lower shell or casing 1 and a cover 2 detachably secured thereto by bolts or similar means (not shown). A pliable diaphragm 3 of any suitable material is clamped at its periphery between the cover and lower casing, and an attachment lug 4 secured to the diaphragm as hereinafter described is bifurcated at the bottom and is pivotally connected by a pin 5 to a lever 6 which in turn is pivoted at 7 and pivotally connected to valve 8 in known manner. The lower shell is tapped and threaded to provide an inlet connection 9 providing a valve seat 9' controlled by valve 8, and an outlet connection 10 which is in communication with the chamber 11 formed below the diaphragm. A vented chamber 12 is formed above the diaphragm which communicates to the atmosphere by a relatively large hole 13 covered by a plate 14 seating against a valve edge 15 and having a smaller hole 16 therein. Flapper valve or plate 14 is retained against accidental removal by a screw 17 threaded into the vent boss 18 surrounding valve plate 14.

The diaphragm 3 is clamped between plates 21 and 22 which are held in position by a shouldered threaded bushing 23 passing therethrough and having a nut 24 threaded on the outer end thereof whereby the plates and diaphragm are held between nut 24 and the shoulder. Washers 25 and 26 of leather or other suitable material may be interposed to prevent leakage. Bushing 23 terminates in a relative sharp valve edge 27 and bore 28 extends through the bushing and is relieved at 29. Boss 4 is recessed at 31 to receive a valve member or washer 32 of rubber, thiocol, leather or other soft material suitable to act as a valve and valve edge or seat 27 is positioned to co-operate therewith. Valve washer 32 receives at its center a flanged bushing 33 and the screw 34 threaded into threaded hole 35 in boss 4 has a shoulder 36 engaging the bushing 33 to hold the valve 32 in place. Screw 34 has guide wings 37 which are received in the hole 28 of bushing 23 and it has a head 38 which serves as one abutment for a spring 39, the other abutment being nut 24. The cover 2 contains the usual spring recess 41 which receives a spring 42 abutting the top diaphragm plate 21 at one end and which is adjustable at the other end by means of an adjustment nut 43 threaded into the recess 41. The outer end of recess 41 is sealed by a cap 44.

The operation is as follows. The spring 42 acting on upper diaphragm plate 21 biases the diaphragm downward with a force depending on the spring adjustment. The spring 39 abutting screw head 38 and nut 24 on bushing 23 draws connecting member 4 with its seat 32 into sealing engagement with valve edge 27. When the device is acting normally as a regulator, the force of spring 42 on the diaphragm 3 is substantially balanced by the pressure in chamber 11 exerted on the diaphragm so that spring 39 has no effect on the diaphragm 3 nor does it affect the pressure in chamber 11 in any way. The full force of spring 39 is effective in maintaining valve 32 closed by valve 27. Should valve 8 seat improperly in closed position, or leak for any other reason, the pressure in outlet chamber 11 may rise higher than normally allowed by the setting of spring 42. Should this occur, the valve 8 engaging the inlet seat will prevent upward movement of the right end of lever 6, and if leakage continues the diaphragm 3 will be moved upward away from lug 4 carrying with it bushing 23 which thus moves edge 27 away from seat 31 and allows the pressure in chamber 11 to escape into chamber 12. As the pressure in chamber 11 just prior to opening of valve 27 balances the bias of spring 42, it may be considered that the additional movement of the diaphragm required to open valve 27 occurs against the additional bias of spring 39, and thus spring 39 determines the differential over the setting of spring 42 required to open valve 27. The diaphragm movement is accurately guided by the wings 37 so as to insure proper seating and unseating of valve 27. Furthermore, as the increased pressure required to open valve 27 acts through lever 6 to force valve 8 against its seat, I prefer to provide a valve seat with a relatively gentle angle of taper, for example 10° to 18° to prevent the valve burying into its seat and thus cause additional movement of lever 6 which might prevent opening of valve 27. The plate 14 may rise freely when the diaphragm 3 rises in closing valve 8 to allow free escape of air from chamber 12, but upon downward movement of diaphragm 3 in opening valve 8 the plate 14 seats against the valve edge 15 to close or restrict opening 13 and substitute therefor the reduced opening 16 to damp the diaphragm movement and thus avoid pulsation. Should the flow of gas into chamber 12 increase beyond the capacity of orifice 16, the valve plate 14 will rise to increase the capacity of the vent and allow free flow therethrough. The vent boss 18 may, if desired, have a pipe connected thereto to pipe escaping gas safely to the exterior of the building in which the regulator is installed.

It is to be noted that if the vent for chamber 12 were made small enough to prevent pulsation of the regulator diaphragm 3 it might not allow free escape of gas from chamber 12 when valve 27 opens, and thus might build up a back pressure in chamber 12 that would act on diaphragm 3 to move it downward and open valve 8 and thus practically render the valve 27 inoperative. However, by providing the flapper restriction or substitute vent in plate 14, the hole 13 may be made large enough to allow free escape of gas from chamber 12 while the vent hole 16 is made small enough to prevent undesired pulsation of the diaphragm 3.

What I claim as my invention and desire to secure by United States Letters Patent is:

1. A gas pressure regulator comprising a casing having an inlet and an outlet connection and a main valve controlling one of said connections, a diaphragm providing a pressure chamber on one side thereof and a damping chamber on the opposite side thereof, a relatively large vent for the damping chamber, a flapper closure for the vent opening outward and providing a vent for restricted flow from the atmosphere into said damping chamber, a release member providing an opening through said diaphragm, a connecting member between the diaphragm and the main valve providing a valve seat, spring means biasing said release member against said valve seat to prevent flow of gas through said diaphragm, and means yieldingly biasing said diaphragm independently of said spring.

2. A gas pressure regulator comprising a casing having an inlet and an outlet connection, a main valve controlling one of said connections, a diaphragm providing a pressure chamber on one side thereof and a damping chamber on the opposite side thereof, a relatively large vent for the damping chamber, a flapper closure for the vent opening outward and having a restricted opening therein, a release member comprising a hollow bushing having a valve edge extending through the diaphragm in sealed relation thereto, a connecting member between the diaphragm and the main valve providing a valve seat for cooperation with said valve edge, a guide member extending through said bushing with a free fit to guide the diaphragm and providing an abutment, a spring interposed between said abutment and said diaphragm to bias the connecting member against the release member to prevent flow of gas through said diaphragm, and means yieldingly biasing said diaphragm independently of said spring.

FRITZ NIESEMANN.